(12) United States Patent
Pickford

(10) Patent No.: US 9,326,536 B2
(45) Date of Patent: *May 3, 2016

(54) PRODUCTION OF MICROWAVEABLE COATED FOOD PRODUCTS

(75) Inventor: Keith Graham Pickford, Manchester (GB)

(73) Assignee: Crisp Sensation Holding S.A., Geneva (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/015,486

(22) Filed: Jan. 27, 2011

(65) Prior Publication Data

US 2012/0196005 A1 Aug. 2, 2012

(51) Int. Cl.
*A21D 13/00* (2006.01)
*A23L 1/01* (2006.01)
(Continued)

(52) U.S. Cl.
CPC ............... *A23L 1/0107* (2013.01); *A23L 1/005* (2013.01); *A23L 1/0128* (2013.01); *A23L 1/3152* (2013.01); *A23L 1/3157* (2013.01); *A23P 1/082* (2013.01); *A23P 2001/088* (2013.01)

(58) Field of Classification Search
CPC ... A23L 1/3103; A23L 1/2125; A23L 1/0052; A23L 1/0114; A23L 1/005; A23L 1/0107; A23L 1/176; A23L 1/0526; A23L 1/31418; A23P 2001/088; A23P 1/12; A23V 2300/16
USPC ...................... 426/95, 291; 99/345
See application file for complete search history.

(56) References Cited

U.S. PATENT DOCUMENTS 2,446,175 A 8/1948 Gerber
3,067,921 A 12/1962 Reifers
(Continued)

FOREIGN PATENT DOCUMENTS

CA 980164 12/1975
DE 2220528 12/1972
(Continued)

OTHER PUBLICATIONS

Kutz, Lynn. "The Great Cover Up:Batters, Breadings, and Coatings" Apr. 2007.*
(Continued)

*Primary Examiner* — Michele L Jacobson
*Assistant Examiner* — Walter Moore
(74) *Attorney, Agent, or Firm* — Price Heneveld LLP

(57) ABSTRACT

A method of producing a frozen, microwaveable, coated food product, said method comprising the steps of:

providing a portion of a solid or solidified substrate;

coating the portion with an aqueous precoating liquid to form a precoated portion;

applying a coating of bonding crumb to the precoated portion to form a crumb coated portion;

applying a batter to the crumb coated portion to form a batter coated portion;

applying a coating of coating crumb to the batter coated portion to form a breaded portion;

frying the breaded portion by contacting said breaded portion for at least 100 seconds with hot oil having a temperature of at least 150° C., thereby producing a fried coated portion having a core temperature in excess of 70° C.; and freezing the fried coated portion by introducing said fried portion into a freezer;

wherein the core temperature of the fried coated portion is not less than 50° C., preferably not less than 60° C. when said fried portion is introduced into the freezer and wherein said core temperature is reduced to less than −15° C., using cryogenic freezing.

19 Claims, 4 Drawing Sheets

(51) Int. Cl.
   *A23L 1/00*    (2006.01)
   *A23L 1/315*   (2006.01)
   *A23P 1/08*    (2006.01)

(56) References Cited

U.S. PATENT DOCUMENTS

| | | |
|---|---|---|
| 3,052,545 A | 9/1963 | Ducharme et al. |
| 3,208,851 A | 9/1965 | Antinori et al. |
| 3,251,531 A | 5/1966 | Hook et al. |
| 3,399,062 A | 8/1968 | Willard, Jr. et al. |
| 3,486,904 A | 12/1969 | Ziegler |
| 3,586,512 A | 6/1971 | Mancuso et al. |
| 3,597,227 A | 8/1971 | Murray et al. |
| 3,619,208 A | 11/1971 | Bahoshy et al. |
| 3,656,969 A | 4/1972 | Horn |
| RE27,531 E | 12/1972 | Murray et al. |
| 3,751,268 A | 8/1973 | van Patten et al. |
| 3,857,976 A | 12/1974 | Szymanski et al. |
| 3,899,602 A | 8/1975 | Rutenberg et al. |
| 3,904,429 A | 9/1975 | Eastman et al. |
| 3,904,601 A | 9/1975 | Tessler et al. |
| 3,915,532 A | 10/1975 | Ashton |
| 3,956,515 A | 5/1976 | Moore et al. |
| 3,969,340 A | 7/1976 | Tessler et al. |
| 3,970,767 A | 7/1976 | Tessler et al. |
| 4,020,564 A | 5/1977 | Bayliss |
| 4,068,009 A | 1/1978 | Rispoli et al. |
| 4,192,900 A | 3/1980 | Cheng |
| 4,208,442 A | 6/1980 | Evans et al. |
| 4,218,485 A | 8/1980 | Lee et al. |
| 4,260,637 A | 4/1981 | Rispoli et al. |
| 4,308,286 A | 12/1981 | Anstett et al. |
| 4,342,788 A | 8/1982 | Clatfelter |
| 4,364,961 A | 12/1982 | Darley et al. |
| 4,393,088 A | 7/1983 | Matsusaka |
| 4,415,599 A | 11/1983 | Bos |
| 4,423,078 A | 12/1983 | Darley et al. |
| 4,427,706 A | 1/1984 | El-Hag |
| 4,440,793 A | 4/1984 | Seki |
| 4,568,550 A | 2/1986 | Fulger et al. |
| 4,568,555 A | 2/1986 | Spanier |
| 4,588,600 A | 5/1986 | Suderman |
| 4,597,974 A | 7/1986 | Fonteneau et al. |
| 4,609,557 A * | 9/1986 | Mao et al. ............. 426/549 |
| 4,609,558 A | 9/1986 | Giacone et al. |
| 4,623,552 A | 11/1986 | Rapp |
| 4,767,627 A | 8/1988 | Ek |
| 4,778,684 A | 10/1988 | D'Amico et al. |
| 4,864,089 A | 9/1989 | Tighe et al. |
| 4,877,628 A | 10/1989 | Stypula |
| 4,908,487 A | 3/1990 | Sarnoff et al. |
| 4,913,918 A | 4/1990 | Stypula |
| 4,915,970 A | 4/1990 | Coffey |
| 4,916,831 A | 4/1990 | Yasumura et al. |
| 4,943,438 A | 7/1990 | Rosenthal |
| 4,948,608 A | 8/1990 | Stypula et al. |
| 4,978,541 A | 12/1990 | Stypula et al. |
| 5,049,711 A | 9/1991 | August |
| 5,057,329 A | 10/1991 | Stypula et al. |
| 5,088,179 A | 2/1992 | Gibbon |
| 5,093,176 A | 3/1992 | Pribonic et al. |
| 5,175,010 A | 12/1992 | Roig et al. |
| 5,202,138 A | 4/1993 | Stypula et al. |
| H1229 H | 9/1993 | McGinley et al. |
| 5,266,340 A | 11/1993 | Samson et al. |
| 5,281,432 A | 1/1994 | Zallie et al. |
| 5,308,636 A | 5/1994 | Tye et al. |
| 5,310,977 A | 5/1994 | Stenkamp et al. |
| 5,310,980 A | 5/1994 | Beckett et al. |
| 5,321,900 A | 6/1994 | Meyer |
| 5,350,585 A | 9/1994 | Sunderland |
| 5,423,477 A | 6/1995 | Valdman et al. |
| 5,431,944 A | 7/1995 | Melvej |
| 5,433,966 A | 7/1995 | Wolt et al. |
| 5,492,707 A | 2/1996 | Chalupa et al. |
| 5,523,102 A | 6/1996 | Morasch |
| 5,565,132 A | 10/1996 | Salyer |
| 5,601,861 A | 2/1997 | Gerrish et al. |
| 5,736,178 A | 4/1998 | Cook et al. |
| 6,097,017 A | 8/2000 | Pickford |
| 6,214,403 B1 | 4/2001 | Broberg et al. |
| 6,261,625 B1 | 7/2001 | Pickford |
| 6,287,621 B1 | 9/2001 | Lacourse et al. |
| 6,288,179 B1 | 9/2001 | Baur et al. |
| 6,326,599 B1 | 12/2001 | Pickford |
| 6,399,130 B2 | 6/2002 | Parker |
| 6,413,562 B2 | 7/2002 | Conforti et al. |
| 6,458,404 B1 | 10/2002 | Adachi |
| 6,503,546 B1 | 1/2003 | Ferrari-Philippe et al. |
| 6,613,370 B1 | 9/2003 | Pickford |
| 6,620,447 B1 | 9/2003 | Paukkunen et al. |
| 7,147,885 B2 | 12/2006 | Asano et al. |
| 8,765,202 B2 | 7/2014 | Pickford |
| 2001/0014363 A1 | 8/2001 | Parker |
| 2001/0024672 A1 | 9/2001 | Kondou et al. |
| 2001/0055641 A1 | 12/2001 | Conforti et al. |
| 2002/0039615 A1 | 4/2002 | Adachi |
| 2002/0119226 A1 | 8/2002 | Conforti et al. |
| 2002/0192332 A1 | 12/2002 | Pickford |
| 2003/0147998 A1 | 8/2003 | Geng et al. |
| 2003/0198711 A1 | 10/2003 | Pickford |
| 2004/0213883 A1 | 10/2004 | Sadek et al. |
| 2005/0169099 A1 | 8/2005 | Sprinkle |
| 2006/0053650 A1 | 3/2006 | Manak et al. |
| 2006/0286240 A1 | 12/2006 | Roosjen |
| 2011/0091612 A1 | 4/2011 | Pickford |
| 2011/0177200 A1 | 7/2011 | Pickford |
| 2011/0177210 A1 | 7/2011 | Pickford |
| 2011/0177211 A1 | 7/2011 | Pickford |
| 2012/0196004 A1 | 8/2012 | Pickford |
| 2012/0196005 A1 | 8/2012 | Pickford |
| 2012/0288592 A1 | 11/2012 | Pickford |
| 2013/0156925 A1 | 6/2013 | Pickford |
| 2014/0093615 A1 | 4/2014 | Pickford |

FOREIGN PATENT DOCUMENTS

| | | |
|---|---|---|
| DE | 2338180 | 2/1975 |
| EP | 17338 | 10/1980 |
| EP | 109226 | 5/1984 |
| EP | 155760 | 9/1985 |
| EP | 327332 | 8/1989 |
| EP | 344726 | 12/1989 |
| EP | 392119 | 10/1990 |
| EP | 510320 | 2/1992 |
| EP | 273475 | 3/1992 |
| EP | 648433 | 10/1994 |
| EP | 1929887 | 6/2008 |
| EP | 2207434 | 8/2011 |
| EP | 2359697 | 8/2011 |
| EP | 2374361 | 10/2011 |
| EP | 2481294 | 8/2012 |
| EP | 2481295 | 8/2012 |
| FR | 2337534 | 8/1977 |
| FR | 2343668 | 10/1997 |
| GB | 1419455 | 12/1975 |
| GB | 2226220 | 11/1988 |
| JP | 57-159451 | 10/1982 |
| JP | 01-168242 | 7/1989 |
| WO | 85/01188 | 3/1985 |
| WO | 88/06007 | 8/1988 |
| WO | 88/06847 | 9/1988 |
| WO | 89/08549 | 9/1989 |
| WO | 92/01384 | 2/1992 |
| WO | 93/03634 | 3/1993 |
| WO | WO93/03634 * | 3/1993 |
| WO | 93/06752 | 4/1993 |
| WO | 93/14995 | 8/1993 |
| WO | 94/13160 | 6/1994 |
| WO | 94/19917 | 9/1994 |
| WO | 94/27887 | 12/1994 |
| WO | 95/07629 | 3/1995 |
| WO | 95/23523 | 9/1995 |
| WO | 95/24110 | 9/1995 |

(56) References Cited

FOREIGN PATENT DOCUMENTS

| WO | 95/30344 | 11/1995 |
|---|---|---|
| WO | 96/02149 | 2/1996 |
| WO | 96/22228 | 7/1996 |
| WO | 96/32026 | 10/1996 |
| WO | 96/38054 | 12/1996 |
| WO | 97/03572 | 2/1997 |
| WO | 97/29653 | 8/1997 |
| WO | 98/08399 | 3/1998 |
| WO | 99/44439 | 9/1999 |
| WO | 2005/112664 | 12/2005 |
| WO | 2006/030333 | 3/2006 |
| WO | 2006/082804 | 8/2006 |
| WO | 2008/078997 | 7/2008 |
| WO | 2010/001101 | 1/2010 |

OTHER PUBLICATIONS

Food Safety.gov "Minimum Cooking Temperatures" Oct. 18, 2009.*
Altschul, A.M., "Low-calorie foods handbook", Georgetown University School of Medicine, Marcel Dekker, Inc., Jul. 29, 1993, pp. 1-10.
Albert, A. et al., "Adhesion in fried battered nuggets: Performance of different hydrocolloids as predusts using three cooking procedures", Food Hydrocolloids 23 (2009) 1443-1448.
Henderson, A., "Cellulose ethers—the role of thermal gelation", Dow Chemical Europe, CH-8810 Horgen, Switzerland, 1988, pp. 265-275.
WO application No. PCT/GB96/01685, International Search Report mailed Oct. 29, 1996.
WO application No. PCT/GB97/00924, International Search Report mailed Jul. 30, 1997.
WO application No. PCT/GB99,00564, International Search Report mailed Jun. 29, 1999.
WO application No. PCT/GB92/01559, International Search Report mailed Dec. 30, 1992.
WO application No. PCT/GB95/00958, International Search Report mailed Aug. 22, 1995.
WO patent application No. PCT/GB2011/050060, International Search Report and Written Opinion mailed May 23, 2011.
WO patent application No. PCT/GB2011/050057, International Search Report mailed May 23, 2011.
WO patent application No. PCT/GB2011/050055, International Search Report and Written Opinion mailed May 20, 2011.
U.S. Appl. No. 09/000,319, Office Action mailed Feb. 3, 1999.
U.S. Appl. No. 09/000,319, Office Action mailed Mar. 27, 2000.
U.S. Appl. No. 09/381,848, Office Action mailed Sep. 26, 2000.
U.S. Appl. No. 09/381,848, Office Action mailed May 8, 2001.
U.S. Appl. No. 09/646,068, Office Action mailed May 8, 2002.
U.S. Appl. No. 09/646,068, Office Action mailed Feb. 4, 2003.
EP patent application No. 11152421.1, Extended Search Report mailed Jul. 5, 2011.
EP patent application No. 11152415.3, Extended Search Report mailed Jul. 5, 2011.
U.S. Appl. No. 13/015,491, "Microwaveable coated food product, and method and apparatus for the manufacture thereof", Keith Graham Pickford, filed Jan. 27, 2011.
U.S. Appl. No. 13/107,814, "Microwaveable batter", Keith Graham Pickford, filed May 13, 2011.
U.S. Appl. No. 13/331,900, "Crumb Manufacture", Pickford et al., filed Dec. 20, 2011.
U.S. Appl. No. 12/764,428, Office Action mailed Jan. 5, 2012.
U.S. Appl. No. 12/764,428, Office Action mailed Jun. 21, 2012.
U.S. Appl. No. 12/764,407, Office Action mailed Oct. 5, 2012.
U.S. Appl. No. 12/764,421, Office Action mailed Oct. 9, 2012.
U.S. Appl. No. 13/015,491, Office Action mailed Oct. 15, 2012.
WO patent application No. PCT/GB2009/001617, Search Report and Written Opinion mailed Jul. 1, 2008.
EP patent application No. 09772781.2, Communication under Rule 71(3) EPC, intent to grant, mailed Mar. 14, 2011.
U.S. Appl. No. 13/331,900, Office Action mailed Dec. 7, 2012.
Clextral Press Release: New drying technology provides optimal drying for complex products and reduces energy expense, Clextral—a division of Groupe Legris Industries, Jun. 2009.
Clextral Rotante Evolum dryer—new generation for sustainable development, Clextral—a division of Groupe Legris Industries, Jun. 2009.
EP patent application No. 1119483.6, Extended European Search Report mailed Aug. 10, 2012.
Perten, Harald, "Application of the falling number method for evaluating alpha-amylase activity," Cereal Chemistry, vol. 41, May 1964, pp. 127-140.
English translation of Paris GDS Moulins FR 2,458,227, Jan. 1981.
Edwards, W.P., "The Science of Bakery Products," Chapter 7—Raw Materials, The Royal Society of Chemistry, 2007.
English translation of Wiedmann et al., EP 0510320A1, Oct. 1992, downloaded from http://translationportal.epo.org on Jan. 25, 2013.
"Criteria for Judging Quality," published Jun. 20, 2008, downloaded from http://web.archive,org/web/20080620034754http://www.theartisan.net/flour_criteria_judging.htm on Jan. 25, 2013.
English translation of RU 2277438, Rye-wheat bread and its proI3vodstva, Berestnev et al., Jun. 10, 2006.
U.S. Appl. No. 12/764,428, Office Action mailed Mar. 22, 2013.
U.S. Appl. No. 12/764,421, Office Action mailed Apr. 1, 2013.
U.S. Appl. No. 12/764,407, Office Action mailed Apr. 5, 2013.
U.S. Appl. No. 13/331,900, Office Action mailed Apr. 10, 2013.
EP patent application No. 12178463, European Search Report mailed Jan. 22, 2013.
WO patent application No. PCT/EP2012/076015, International Search Report and Written Opinion mailed May 7, 2013.
U.S. Appl. No. 13/015,491, Office Action mailed Jun. 5, 2013.
U.S. Appl. No. 13/107,814, Office Action mailed Jun. 21, 2013.
U.S. Appl. No. 12/669,953, Notice of Allowance mailed Jul. 25, 2013.
EP patent application No. 11163536.3, Communication under Rule 71(3) EPC, Intent to Grant, mailed May 30, 2013.
U.S. Appl. No. 12/764,407, Office Action mailed Oct. 25, 2013.
U.S. Appl. No. 13/015,491, Office Action mailed Nov. 8, 2013.
U.S. Appl. No. 14/105,847, "Stabilized Cheese Products," van der Kolk et al., filed Dec. 13, 2013.
U.S. Appl. No. 12/764,407, Notice of Allowance mailed Feb. 12, 2014.
U.S. Appl. No. 13/107,814, Office Action mailed Feb. 13, 2014.
U.S. Appl. No. 14/170,371, "Microwaveable Batter," Wilhelmus Johannes Gerardus Michiels et al., filed Jan. 31, 2014.
U.S. Appl. No. 14/029,681, Office Action mailed Apr. 2, 2014.
U.S. Appl. No. 12/764,421, Notice of Allowance mailed Apr. 11, 2014.
U.S. Appl. No. 14/249,250, "Stabilisation of microwave heated food substrates," Keith Graham Pickford, filed Apr. 9, 2014.
U.S. Appl. No. 14/266,611, "Coated stabilized microwave heated foods," Keith Graham Pickford, filed Apr. 30, 2014.
U.S. Appl. No. 13/953,585, Office Action mailed Jul. 8, 2014.
U.S. Appl. No. 14/458,051, "Microwaveable Batter," Keith Graham Pickford, filed Aug. 12, 2014.
U.S. Appl. No. 13/015,491, Office Action mailed Sep. 11, 2014.
EP patent application No. 11152421, Rule 71 Intention to Grant mailed Nov. 13, 2014.
Chen, Wei, et al. "Effect of freezing and microwave reheating conditions on crispness of pre-fried coated food." Science and Technology of Food Industry 9 (2008): 025.

* cited by examiner

PRODUCTION OF MICROWAVEABLE COATED FOOD PRODUCTS

TECHNICAL FIELD OF THE INVENTION

This invention relates to a method of production of coated food products which may be cooked or reheated using a microwave oven or using a combined microwave and conventional over, referred to collectively in this specification as a microwave oven. The invention also relates to apparatus for carrying out the method and to food products made by the method or using the apparatus. The invention relates particularly but not exclusively to crumb coated products, particularly chicken nuggets or other products wherein a meat, fish, poultry, vegetable, fruit, fungus materials or dairy products substrate is coated with a batter coating and one or more layers of crumb, wherein the products may be cooked or reheated from a frozen state using a microwave oven.

BACKGROUND OF THE INVENTION

Use of a microwave oven for cooking or reheating coated products is problematic because the substrate is heated from the inside by the microwave radiation generating steam which may damage the batter and crumb coatings. Conventional coated products are therefore unsuitable for use in microwave ovens.

Many food materials, for example natural muscle of poultry, fish or red meat or vegetable or processed foods contain a large percentage of water. Most fresh foods contain more than 60% water. Some of this water is bound, that is tightly attached to the constituent cells. The remaining mobile water is available and can be frozen. If a food product is frozen to a core temperature of between −1° C. and −30° C. or lower and is placed and irradiated in a microwave oven, the microwave energy will be primarily absorbed by the frozen available water. Whereas in conventional cooking heat is applied from the exterior, in microwave cooking heat is generated from within. The process of heating can be very rapid so that available water is converted into steam. When a food product is allowed to stand after heating in a microwave oven, water can continue to be expelled from the product. This is particularly noticeable for example when heating frozen fish muscle. The loss of water causes any food coating, particularly a batter, pastry or breadcrumb coating to become soggy and unpalatable. In addition the core of the substrate may become dry due to the loss of water.

WO 93/03634 describes a method of producing a coated foodstuff which may be reheated by microwave irradiation, the method comprising: applying to the foodstuff a predust; applying a batter to the predusted foodstuff; frying the battered foodstuff, and cooling the fried product.

WO 95/30344 describes a process for microwaveable coated food products comprising the steps of predust application, batter application, crumb application, flash frying, freezing and packaging.

WO 97/03572 describes a process for microwaveable coated food products, such as chicken nuggets, comprising the steps of predust application, batter application, crumb application, flash frying, freezing and packaging.

WO 2010/001101 describes a method of manufacture of a crumb coated food product comprising the steps of: forming an aqueous mixture comprising: flour, sodium bicarbonate, optional additives and water; adding the mixture into an extruder; adding an aqueous gelling agent to the extruder; extruding the resultant mixture at a temperature greater than 100° C. to form an expanded porous product; drying the product, and milling the dried product to form a crumb. The crumb so obtained is particularly suitable for use in the preparation of coated food products that are cooked or reheated from a frozen state using a microwave oven.

These and other features of the invention are further described and exemplified in the detailed description below.

SUMMARY OF THE INVENTION

The inventor has developed a method for the production of a frozen coated food product that can be reheated or cooked in a microwave oven to produce a ready-to-eat product with outstanding sensory properties, especially a crunchy coating in combination with a succulent moist core.

A first aspect of the present invention provides a method for production of a frozen coated food product that can be reheated or cooked in a microwave oven the method comprising the steps of: providing a portion of a solid or solidified substrate;

coating the portion with an aqueous precoating liquid to form a precoated portion;

applying a coating of bonding crumb to the precoated portion to form a crumb coated portion;

applying a batter to the crumb coated portion to form a batter coated portion;

applying a coating of coating crumb to the batter coated portion to form a breaded portion;

frying the breaded portion, thereby producing a fried coated portion having a core temperature in excess of 70° C.; and freezing the fried coated portion by introducing said fried portion into a freezer;

wherein the core temperature of the fried coated portion is not less than 50° C. when said fried portion is introduced into the freezer and wherein said core temperature is reduced to less than −15° C. using cryogenic freezing.

According to a second aspect of the present invention, there is provided apparatus for carrying out the aforementioned method, said equipment comprising:

substrate forming apparatus for forming portions of a solid or solidified substrate;

coating apparatus, arranged to receive the portions and to immerse the portions in a viscous aqueous coating composition to produce precoated portions;

a first crumb applicator, arranged to receive the pre-coated portions and to apply a layer of crumb onto the precoated portions to form crumb coated portions;

a batter coating applicator, arranged to receive the crumb coated portions and to immerse the crumb coated portions in a batter to produce batter coated portions;

a second crumb applicator, arranged to receive the batter coated portions and to apply a layer of crumb onto the batter coated portions to form multiple coated portions;

a fryer, arranged to receive the multiple coated portions and to immerse the multiple coated portions in hot oil to produce hot fried coated portions;

a cryogenic freezer, arranged to receive and cryogenically freeze the hot fried coated portions

DRAWINGS

The invention is further described by means of example but not in any limitative sense with reference to the accompanying drawings, of which:

DETAILED DESCRIPTION OF THE INVENTION

Figure 1:
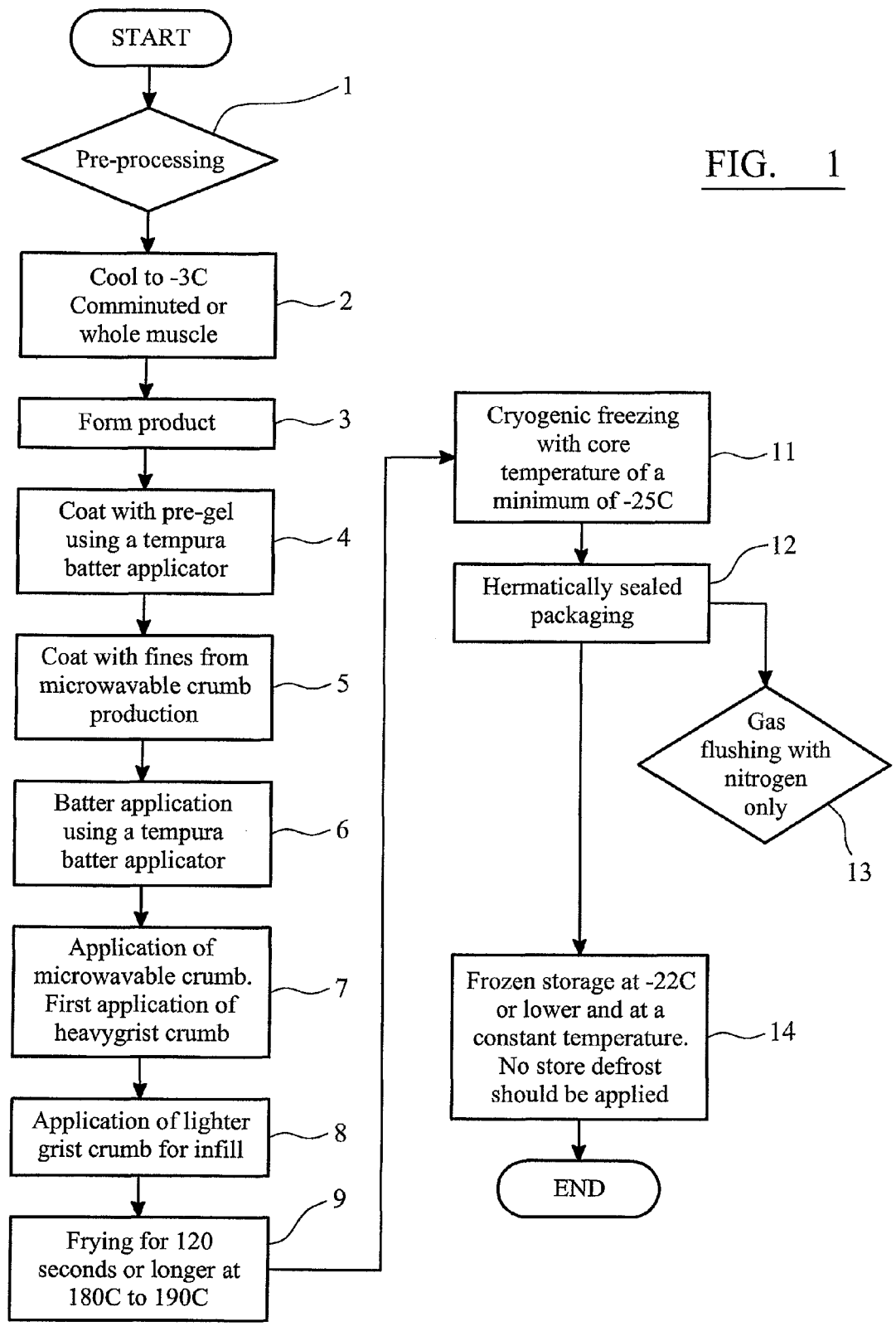
FIG. 1 is a flow chart illustrating steps of a method in accordance with the present invention.

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order to not unnecessarily obscure the present invention.

Accordingly, a first aspect of the present invention relates to a method of producing a frozen, microwaveable, coated food product, said method comprising the steps of:
  providing a portion of a solid or solidified substrate;
  coating the portion with an aqueous precoating liquid to form a precoated portion;
  applying a coating of crumb to the precoated portion to form a crumb coated portion;
  applying a batter to the crumb coated portion to form a batter coated portion;
  applying a coating of coating crumb to the batter coated portion to form a breaded portion;
  frying the breaded portion, by contacting said breaded portion for at least 100 seconds with hot oil having a temperature of at least 150° C., thereby producing a fried coated portion having a core temperature in excess of 70° C.; and
  freezing the fried coated portion by passing said fried portion into a freezer;
  wherein the core temperature of the fried coated portion is not less than 50° C., preferably not less than 60° C. when said fried portion enters the freezer and wherein said core temperature is reduced to lower than −15° C. using cryogenic freezing.

The invention relates to a microwaveable frozen product, that is a product which has been cooked before freezing and which can be reheated in a microwave oven or combination oven to give a satisfactory product with a succulent core and crisp crumb coating. Products of this invention may be also reheated in a conventional thermal oven.

It has been found that the freezing conditions are important in order to produce a frozen coated food product that, although it comprises a moist core, can be heated in a microwave oven to yield a ready-to-eat hot product with a crunchy coating. More specifically, it has been found that the core temperature of the fried coated portion should be reduced very quickly after frying, i.e. when the core temperature of the fried portion is still high. Although we do not wish to be bound by theory, it is believed that rapid freezing of the fried portion may enhance the structural integrity of the product, may reduce formation of ice crystals and may reduce the size of any ice particles which may be formed within the product.

If ice crystals are present in a battered breaded product they can become superheated in a microwave oven creating hot spots in the core. Also migration of ice crystals on storage can lead to a build up of localised ice which on heating can result in release of excessive moisture near to the surface coating.

In order to minimise ice crystal formation during freezing, the fried portion should be introduced in the freezer as quickly as possible after the frying. Accordingly, the core temperature of the fried coated portion preferably may not decrease by more than 25° C., more preferably by not more than 20° C. and most preferably by not more than 15° C. before the fried portion is introduced in the freezer, especially before it is contacted with liquid gas.

In a particularly preferred embodiment, the fried coated portion has a core temperature of more than 65° C., preferably more than 70° C. when it is introduced into the freezer.

In a preferred embodiment, the core temperature of the fried portion is not allowed to fall below the temperature specified when the substrate is introduced into the freezer.

In another preferred embodiment, the core temperature of the fried coated portion is reduced at a very high rate from 60° C. to −15° C. Typically, this temperature drop is realized in less than 40 minutes, more preferably less than 30 minutes and most preferably less than 20 minutes, dependent on the weight of the particles, dimensions of the particles, temperature on entry and the number of particles passing through the freezer.

In use of the freezer that is employed in the present method, the core temperature of the fried coated portion is typically reduced to less than −20° C. or even less than −22° C.

The cryogenic freezing of the fried coated portion in the present method suitably comprises contacting said fried portion with a liquid gas or vapourising liquid gas, more preferably cryogen, especially liquid nitrogen.

In a particularly preferred embodiment, the fried portion has a core temperature of at least 50° C., more preferably of at least 60° C., even more preferably of at least 65° C. and most preferably of at least 70° C. when it is contacted with a cryogen.

The portions of solid or solidified substrate that are coated with the aqueous precoating liquid may be solid at ambient temperature or, alternatively, they may be liquid or paste-like at ambient temperature. In the latter case, for example. if the substrate is not solid at ambient temperature, the substrate is cooled to a sufficiently low temperature to render it solid, before applying the precoating liquid.

The benefits of the present invention are particularly appreciated when the substrate contains an appreciable amount of water. During microwave reheating some of the water contained in the substrate will turn into steam. Although the inventor does not wish to be bound by theory, it is believed that the fried coating of the present microwaveable product is permeable to the steam that is generated during microwave reheating and hardly absorbs any of the steam, thereby retaining its crisp nature. Typically the substrate contains at least 15 wt. %, more preferably at least 25 wt. % and most preferably at least 30 wt. % water. The water content of the core material normally does not exceed 90 wt. %.

Examples of food materials that can be used to form substrate portions include fish, meat, poultry, shellfish, shrimps, dairy products (e.g. cheese), ragu and combinations thereof. According to a particularly preferred embodiment animal material selected from fish, meat, poultry, shellfish, shrimps and combinations thereof represents at least 40 wt. %, even more preferably at least 60 wt. % and most preferably at least 80 wt. % of the uncoated portion of substrate.

The present method may suitably be used to produce coated food products from portions of solid substrate have a weight in the range of about 15-200 g. Preferably, the portions of solid substrate have a weight in the range of about 10-50 g generally about 25 g.

Preferably the portion of substrate has a thickness not greater than 50 mm, more preferably not greater than 25 mm, most preferably of not greater than 15 mm. This allows sufficient penetration of microwave radiation within a period of 2 to 3 minutes using the power available in a typical domestic microwave oven. Thicker portions may be partially heated, turned or further heated to completion if desired.

The portions of the substrate may be whole portions, for example whole muscle portions such as individual steaks or fillets or larger pieces which may be cut into individual portions after cooking or reheating. Alternatively the pieces may comprise chopped or comminuted pieces, for example, nuggets or minced products which may be reformulated into larger portions. Use of pieces with uniformly sized and weighted cores is preferred.

The solid or solidified substrate may be extruded or ejected into portions, e.g. on a wire mesh conveyor, using a die. The temperature of the extruded portions may be in the range of −6 to 6° C. preferably of −4 to −1° C. to stiffen the substrate to facilitate handling during the subsequent processing steps.

The substrate, especially if it is composed of chopped or comminuted pieces, is preferably impregnated with an aqueous or particulate stabiliser composition, e.g. by soaking, permeation or injection (vacuum pulse injection) into the substrate prior to forming into portions. Examples of suitable stabiliser compositions can be found in WO 97/03572, which is incorporated herein by reference for all purposes. The substrate may be impregnated with the stabiliser composition to the extent that the ingredients penetrate at least the surface layer. It is beneficial if the region of the stabiliser impregnation extends throughout the substrate or at least impregnates the bulk of the substrate structure. Impregnation may be achieved by soaking, permeation or injection into the substrate prior to forming into portions. Vacuum permeation is conveniently employed.

Application of the bonding crumb is facilitated by the use of the aqueous precoating liquid since the crumb particles will not adhere sufficiently to a dry substrate or to each other to form a coherent shell encasing the substrate. Therefore, use of the precoating liquid has the additional advantage that the crumb layer may adhere to the substrate providing a complete covering or shell surrounding the substrate to reduce the escape of water vapour and impede any ingress of fat during frying.

The aqueous precoating liquid that is applied onto the substrate portion typically contains at least 80 wt. %, preferably at least 90 wt. % of water. In order to minimize drip-off and to maximize adhesion of the crumb, the precoating liquid is preferably viscous, and may have a minimum viscosity of 300 cP, measured using a Brookfield viscometer with a number 3 spindle at 60 rpm at 10° C. Even more preferably, said viscosity lies within the range of 350-450 cP, most preferably in the range 380-420 cP when fully hydrated.

The aqueous precoating liquid preferably contains 0.1-5 wt. %, more preferably 0.3-3 wt. % of dry matter.

A precoating layer serves as an additional barrier to loss of moisture from the substrate during subsequent microwave heating stage. Without wishing to be bound by theory it is believed that the precoating layer serves as a barrier to fat pickup by the core, avoiding impairment of the flavour of the core. Impregnation of the core with a stabiliser composition as described herein before contributes to maintaining an optimum moisture content of the core during cooking or reheating.

The aqueous precoating liquid may be applied onto the portion of solid or solidified substrate by immersing said substrate in a bath containing the aqueous precoating liquid or by spraying or brushing said precoating liquid onto the portion. Preferably, the precoating liquid is applied by immersing it in a bath of precoating liquid, e.g. by passing the portion through such a bath with the help of a conveyor belt. The term "bath" refers to any convenient receptacle, trough or container suitable for holding a liquid.

Another important feature of the present method lies in the application of a bonding crumb layer before the application of a batter. This crumb layer is bound to the substrate by the aqueous precoating liquid and forms a stabilising thermal barrier underlying the batter and optional outer crumb coating(s). This may provide a barrier to escape of moisture and ingress of oil during a prolonged frying stage. This crumb shell also serves to protect the surface of the substrate from excessive local heating during frying.

Particularly good results can be obtained if the bonding crumb employed in the present method is a milled farinaceous dough extrudate containing 0.05-5 wt. %, more preferably 0.1-3. % by dry weight of added hydrocolloid. Crumb without an added hydrocolloid generally forms a soggy mass immediately upon mixture with water. The hydrocolloid contained in the crumb may be any hydrocolloid which forms a sol when mixed with water. Preferred hydrocolloids produce a crumb which retains shape when in contact with water having a temperature of 20° C. for a period of 60 seconds.

The term "added hydrocolloid" as used herein refers to hydrophilic polymers that are not naturally present in the farinaceous component of the dough extrudate and that are capable of increasing the viscosity of an aqueous medium to which they have been added. These hydrophilic polymers are suitably selected from polysaccharides, modified polysaccharides and proteins.

The hydrocolloid used in the bonding crumb may be selected from natural gums, modified gums, gelatine, pectin, alginate, modified starch, agar, carrageenan, furcellaran, arabinogalactan, xanthan, and combinations thereof. Preferably, the hydrocolloid is selected from natural gums and combinations thereof.

Examples of natural gums that may be employed as added hydrocolloid in the milled farinaceous dough extrudate include guar gum, xanthan gum, locust bean gum, gum Arabic, tragacanth, gum karaya, gum ghatti and combinations thereof.

Most preferably, the added hydrocolloid may be selected from guar gum, locust bean gum, xanthan gum and combinations thereof.

The bonding crumb employed in the present method typically has a mass weighted average particle size of less than 2 mm. More preferably, the bonding crumb has a mass weighted average particle size of 0.1 to 1.5 mm, even more preferably of 0.15 to 1 mm, and most preferably of 0.25 to 0.9 mm.

The batter that is applied onto the crumb coated portion in accordance with the present method preferably comprises, calculated by weight of dry matter, 20-55 wt. % of starch; 20-55 wt. % of flour; and 3-20 wt. % of egg solids. Examples of batter formulations that may suitably be employed in the present process are described in WO 96/32026. The starch contained in the batter may be provided by a flour component or it may have been added as a purified starch ingredient, for example high amylose starch.

Typically, the batter has a viscosity of 200-1000 cP, more preferably of 300-800 cP, most preferably of 500-600 cP, measured using a Brookfield viscometer with a number 3 spindle at 60 rpm when it is applied to the crumb coated portion.

The batter may be applied onto the crumb coated portion by an apparatus comprising a bath containing the batter through which the crumb coated portion is passed by means of a conveyor. A tempura applicator is preferred, that is a bath containing circulating batter through which a conveyor passes. e.g. TempuDipper™ (CFS) although one may also use a curtain-type e.g. WetCoater™ (CFS) applicator or other convenient apparatus of a similar specification.

Advantageously, the coating crumb employed in the present method has a larger particle size than the bonding crumb. Preferably, the coating crumb has a mass weighted average particles size that is at least 50% higher than the mass weighted average particle size of the bonding crumb.

The present method may suitably employ a crumb coating apparatus that comprises a first conveyor and a second endless conveyor located below an end of the first conveyor, and passing beneath a flow of fine crumb particles so that portions fall from the first conveyor onto a layer of particles on the second conveyor. The second conveyor may pass through a curtain of fine crumb falling onto the conveyor surface so that the portion falls onto the crumb causing the crumb to adhere to the surface layer of the aqueous precoating, and is then coated by the curtain of falling crumb particles. The apparatus may comprise a dispenser having an outlet extending across of the conveyor to provide the curtain of fine crumb extending across the path of the portions on the conveyor. A roller may be located above the conveyor on the exit side to bear on the coated portion to improve adhesion of the fine crumb.

Crumb may be applied in excess to the portion using a crumb applicator for example a CrumbMaster™ (CFS). The crumb coated portion may be passed through a roller to improve adhesion.

The total amount of aqueous precoating liquid, batter and crumb that is applied onto the portion in the present method is preferably selected such that, after frying, the fried portion has a weight that exceeds the weight of the uncoated portion of solid substrate by 25-100%, preferably by 30-60%.

The one or more coatings of crumb together typically represent 5-80 wt. %, preferably 15-50 wt. % of the fried portion.

The breaded portion is fried to cook the substrate and coating layers. The period of cooking is preferably sufficient to completely cook the substrate preventing any health risk in the event that a frozen product is insufficiently reheated from the frozen state in a microwave oven. A comparatively long period of reheating in a microwave oven is undesirable since the substrate is heated from the inside by the microwave energy resulting in a loss of moisture. This may lead to a dry core and damage to the coating layers.

A homogeneous outer crumb coating, with none of the underlying batter layer being exposed is advantageous to provide a uniformly browned appearance after a prolonged period of frying. This may be compared to a shorter period of frying as commonly used for conventionally thermally cooked breaded products.

For conventional thermally cooked breaded products such as chicken nuggets, a short period of frying for example 90 seconds or less has been followed by a further period of cooking in a hot air oven. This is disadvantageous for microwave cookable products because the core of the substrate may not be thoroughly cooked during reheating from the frozen state. Prolonged heating of conventional products in a microwave oven leads to excessive loss of moisture and consequent damage to the coating layers.

During the frying step the breaded portion, optionally after having been coated with one or more additional crumb layers, is preferably contacted with the hot oil for 120-300 seconds, more preferably for 130-240 seconds, most preferably for 140-180 seconds.

The hot oil that is used for frying the breaded portion preferably has a temperature of 160-200° C., more preferably of 170-195° C. and most preferably of 175-190° C.

The oil employed preferably is a vegetable oil. The term "vegetable oil" encompasses non-modified vegetable oils, hydrogenated vegetable oils, fractions of vegetable oils (e.g. olein or stearin fractions), inter-esterified vegetable oils and combinations thereof. Pure rapeseed oil is preferred.

Preferably the core temperature of the fried portion is greater than 72° C., more preferably greater than 74° C.

The fried coating of the present food product—including all coating layers—preferably has an average thickness of 8. mm, more preferably of 5 mm and most preferably of 3 mm dependent on the size of crumb used.

Frying in accordance with this invention is advantageous in comparison to flash frying followed by hot air cooking as the latter may not give a coating with desired hardness without moisture loss from the core.

The breaded portion is suitably fried by immersing the breaded portion in the hot oil, e.g. by passing it through a bath of hot oil by means of a conveyor belt. The frying apparatus preferably comprises a double layer of parallel endless belts both layers passing beneath the oil surface, a portion carried on a lower layer being prevented from floating during frying by contact with an upper layer. The belt may comprise wire screens or other perforated configurations.

The frozen products are suitably packaged for storage and distribution. Packaging under an inert atmosphere e.g nitrogen is preferred.

The frozen product, may be reheated or cooked from the frozen state before use using an oven selected from: a microwave oven, a conventional oven or grill, deep or shallow fried, or an oven using a combination of microwave and conventional heating.

A further aspect of the invention relates to a microwaveable coated food product that is obtained by a method as defined herein before. Most preferably, said food product is a frozen coated food product.

Yet another aspect of the invention relates to apparatus for producing a frozen coated food product as previously defined, the apparatus comprising:

a substrate forming apparatus arranged for forming portions of a solid or solidified substrate;

a coating apparatus, positioned downstream of the substrate forming apparatus, arranged for immersing the portions in a viscous aqueous coating composition to produce precoated portions;

a first crumb applicator, positioned downstream of the coating apparatus, arranged for applying a layer of crumb onto the precoated portions to form crumb coated portions;

a batter coating applicator, positioned downstream of the crumb applicator, arranged for immersing the crumb coated portions in a batter to produce batter coated portions;

a second crumb applicator, positioned downstream of the batter coating applicator, arranged for applying a layer of crumb onto the batter coated portions to form multiple coated portions;

a fryer, positioned downstream of the second crumb applicator, arranged for immersing the multiple coated portions in hot oil to produce hot fried coated portions;

a cryogenic freezer, positioned downstream of the fryer, arranged to receive and rapidly freeze the hot fried coated portions.

Figure 2:
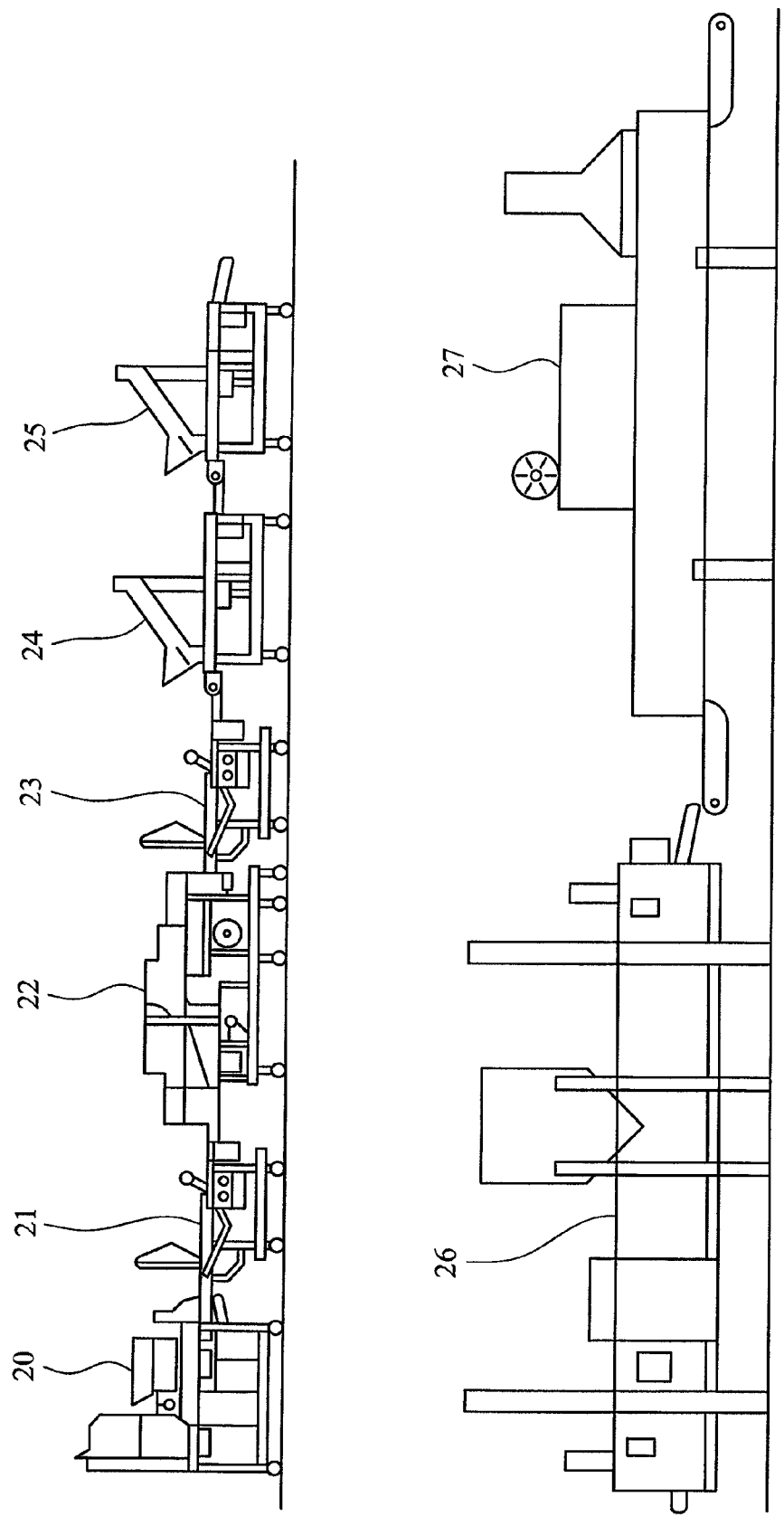
FIG. 2 is a side elevation of apparatus in accordance with this invention.

FIG. 1 is a flow chart illustrating stages of the method of an embodiment of this invention. The apparatus is shown in side elevation in FIG. 2 and component parts are shown in more detail in FIGS. 3 to 5.

In a pre-processing stage (1), pieces of chicken or other substrate are cut to an appropriate size or comminuted as required. The substrate pieces are impregnated with a stabiliser composition, as described in Examples 1 and 2. A forming machine (20) is used. A conventional forming machine may be arranged to extrude chicken substrate pieces having a predetermined thickness and one or more shapes. The pieces are extruded onto a conveyor arranged to carry them to a tempura dipper containing an aqueous coating composition as described in Example 3.

Figure 3:
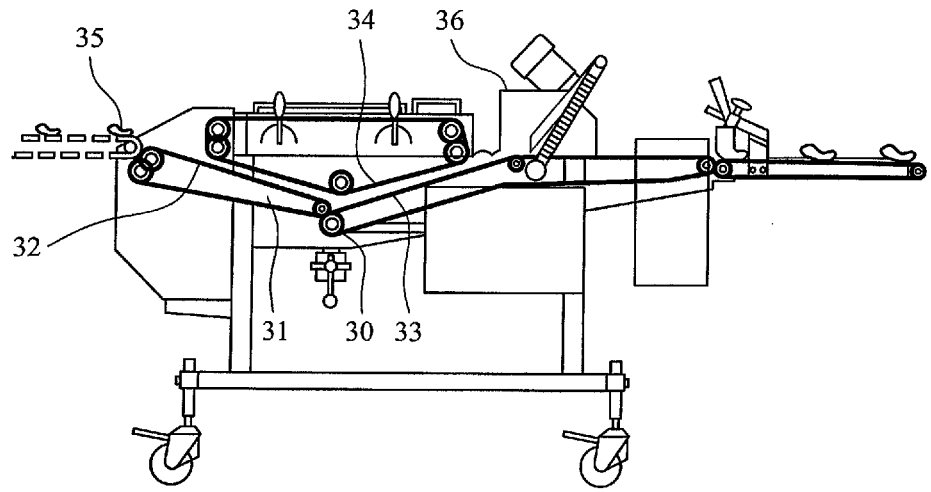
FIG. 3 is a cross sectional view of a coating apparatus.

The tempura coating apparatus is shown in FIG. 3. This comprises a reservoir (30) for an aqueous coating composition or pre-gel (31). A first lower conveyor (32) carries pieces (35) beneath the surface of the aqueous composition. A second upper conveyor (34) prevents the pieces (35) from floating. This ensures complete coating of the pieces. The upper and lower conveyors are disposed in parallel spaced relation to form a channel within which the pieces are located during coating.

A second lower conveyor (33) carries the substrate pieces out of the reservoir beneath the upper conveyor (34). The substrate pieces emerging from the reservoir pass under an air jet (36) to remove excess liquid.

Following application of the pre-gel or aqueous coating a coating of crumb fines is applied using a crumb applicator.

The fine crumb coated substrates are then passed through a tempura batter applicator (6) to apply batter followed by application of the outer crumb. The batter mixture is prepared in a mixing tank with a high shear mixer and a heating system to maintain a temperature of 42° C. for 30 minutes. The mixture is then transferred to a holding tank maintained at 3° C. to 4° C. with the viscosity being adjusted as necessary be addition of water before being pumped to the tempura-type applicator.

The batter coating may be applied using a tempura coating apparatus of the kind shown in FIG. 3. The substrate pieces which have been coated with aqueous coating and crumb fines are passed through a bath of the batter using a wire mesh conveyor, so that complete immersion of the pieces is achieved.

A first layer of heavy grist crumb may be applied (7) to the batter coated product followed by a lighter grist crumb to infill between the heavy crumb particles (8). Alternatively, a single outer crumb layer may be employed, particularly when using a large sized outer crumb.

Where two outer crumb layers are used, a first coating of outer crumb may be applied using a conventional crumb applicator. The crumb is preferably sieved to remove fines and small particles. A second coating of outer crumb may be applied to ensure complete covering of the battered substrate.

The crumb coated product is then passed (9) through an elongate reservoir containing heated oil to fry the products.

A frying time of 2 minutes 20 seconds was used although this may be varied dependent on the weight and size of the particles. After frying the core temperature of the products was in the range 74° C.-85° C. A small loss of weight was observed due to loss of water from the substrate but this is mostly compensated for by an uptake of oil.

Following frying the hot fried products were directly without delay passed using a conveyor into a cryogenic freezer so that the core temperature of the fried products is reduced to a maximum of −25° C., usually −30° C. to −35° C. or lower during a period of 30 minutes or less.

Figure 5:
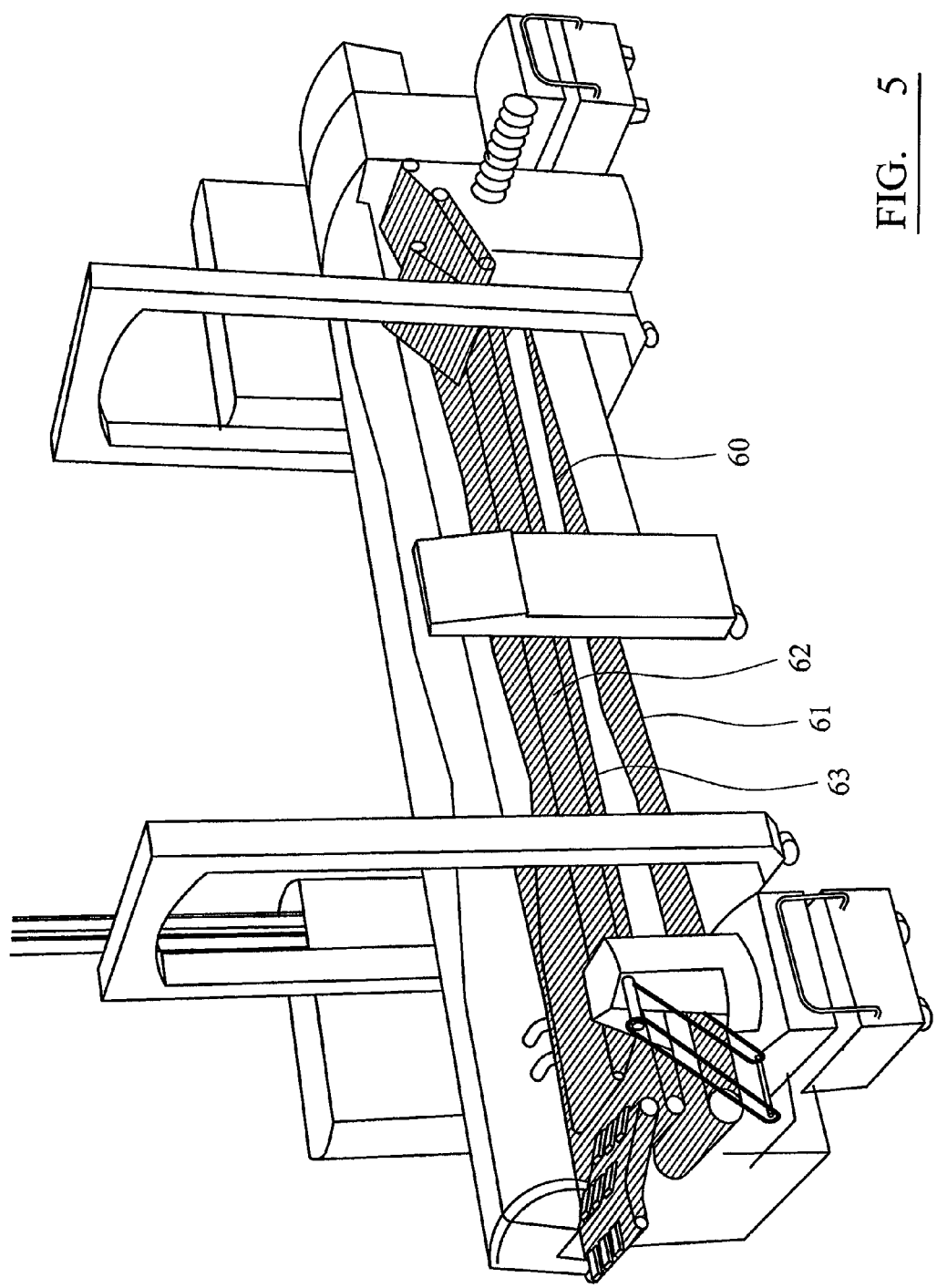
FIG. 5 is a cut away perspective view of a fryer.

The construction of the fryer is shown in detail in FIG. 5. The elongate reservoir of the fryer contains rapeseed oil that is heated to a constant temperature of 180 to 188° C. Pure rapeseed oil is employed.

The frozen products were packaged in hermetically sealed packages (12). The packing may be flushed with nitrogen (13) although this may not be used dependent on the required shelf life of the packaged products.

The crumb was prepared as disclosed in WO 2010/001101, the disclosure of which is incorporated herein by reference for all purposes.

EXAMPLES

The following examples provide details illustrating aspects of embodiments of the present invention. These examples are provided to exemplify and more clearly illustrate aspects of the present invention and in no way intended to be limiting.

Example 1

Stabiliser Composition

A stabiliser composition was prepared using the following ingredients:

| Ingredient | % |
| --- | --- |
| cellulose gum (Methocel ™ A4M) | 15.0 |
| modified starch (Thermflo ™) | 24.0 |
| polydextrose | 40.0 |
| xanthan gum | 6.0 |
| egg albumen | 15.0 |
| Total | 100.0 |

The composition was dissolved in water to produce a solution with a concentration suitable to stabilise the particular substrate in use. To this end the dry powder mixture was partially hydrated in a tub and then poured into a bowl chopper. The bowl chopper was then run for two to three minutes until the mixture was fully hydrated. The mixture can be hydrated directly in the bowl chopper if required. Alternatively, the stabiliser may be hydrated using a high shear mixer fitted with a general purpose head.

This general purpose formula may be modified to increase its efficiency in specific substrates. The above formula may be modified by addition of citric acid (up to 1%) and ascorbic acid (up to 2%) with the polydextrose (for example Litesse II (Trade Mark)) being reduced accordingly.

Example 2

Impregnation of Substrate with Stabiliser Composition

A chicken mixture for chicken dippers or nuggets was prepared with the following composition which was prepared as a dry mixture, as an alternative to use of a hydrated stabiliser composition. The stabiliser of Example 1 was used.

| | |
|---|---|
| chicken emulsion | 20% |
| skin—3 mm | 18% |
| chicken breast—10 mm | 50% |
| water | 2% |
| rusk | 2% |
| stabiliser (Example 1) | 5% |
| seasoning | 3% |
| | 100% |

The chicken breast was chilled to −3° C. and minced using a 10 mm plate. After mincing, the temperature was 0-3° C. Water was added with mixing. A chicken emulsion comprising the following ingredients was added with mixing:

| | |
|---|---|
| chicken skin | 44% |
| Water | 44% |
| soya isolate | 11% |
| Salt | 1% |
| | 100% |

The stabiliser in accordance to Example 1 was added and mixed thoroughly. Rusk was added with mixing following by seasoning. A dry powder flavouring was preferred. The composition was allowed to dissolve in use in water which was present in the substrate in order to form an aqueous stabiliser solution in situ. (Stage 1)

A vacuum was applied to the mixture to consolidate the structure following which the chicken mixture was chilled to −3° C. (Stage 2) and formed into shaped pieces (Stage 3).

A similar procedure was used for other comminuted meat products. Large particulate cores may be manufactured using a similar method.

Example 3

Aqueous Coating Composition

The following mixture was prepared:

| | |
|---|---|
| modified starch (Thermflo) | 35% |
| thickener (Methocel A4M) | 25% |
| xanthan gum | 25% |
| egg albumen | 15% |
| | 100% |

The mixture was dissolved in water to form a 1% solution using a CFS Scanbrine mixer with paddle agitation. The solution was left to stand for 24 hours to form a fully hydrated gel or viscous solution.

A pump is necessary to run the machine but after a short while bubbles may form in the gel solution in the applicator. To prevent this problem food grade anti foaming agents can be used. Polydimethylsiloxane is preferred but methylphenylpolysiloxane or polyethylene glycol can be used.

Example 4

Batter Coating Composition

A batter coating composition was prepared by mixing the following ingredients:

| Ingredient | % |
|---|---|
| Soya flour (Hisoy) | 31.0 |
| high amylase starch (Hylon 7) | 48.0 |
| cellulose gum (Methocel A4M) | 2.0 |
| whole egg (Henningsen W1) | 13.0 |
| D-xylose | 3.0 |
| monosodium phosphate | 1.9 |
| ammonium bicarbonate | 0.7 |
| glucono D-lactone | 0.7 |
| sodium acid pyrophosphate | 0.3 |
| alpha-amylase | 0.1 |
| | 100.00 |

The batter was mixed in batches using a Silverson DX high shear mixer on a gantry with a slotted disintegrating head. Batches were mixed in the ratio of 25 kilos water to 12.5 kilos dry batter powder in a vat with a diameter of 68 cm. Thereafter, the mix was diluted as required for example to give a ratio of water:powder of 2.4:1.

In full scale production the batter ingredients were mixed in a ratio of water:powder of 2.4:1 using two 200 liter stainless steel vessels linked by a pump and an inline Silverson mixer with a high shear slotted disintegrating head. One tank was fitted with a paddle and was filled with water at 15-20° C. The dry ingredients were added to the water and wetted by rotation of the paddle. The second tank was fitted with a cooling jacket and a return pipe to the first vessel. The batter mixture was circulated through the high shear head until a temperature of 42° C. was reached by mechanical heat transfer. External heating may be employed to avoid a tendency to over shear the starch. When 42° C. was reached, the mixing and enzymolyis were complete. The batter was transferred to the second vessel and cooled. A heat exchanger may be used to cool the mixture. After cooling, the batter was pumped into a tempura type batter applicator.

The viscosity in the batter mixture was in the range 550-650 cP as measured by a number 3 spindle at 60 rpm. The batter was found to give a good rate of pickup and a crisp coating after frying.

Example 5

Preparation of Crumb

A hydrocolloid containing crumb was produced by extrusion of a farinaceous dough mixture as disclosed in WO2010/001101.

A flour composition was prepared as follows:

| | |
|---|---|
| flour mixture | 96.4% |
| sodium bicarbonate (Bex baking powder) | 2.0% |
| glyceryl monostearate | 0.6% |
| salt | 1.0% |
| | 100.0% |

The gelling agent was as follows:

| | |
|---|---|
| guar gum | 67.00% |
| sodium metabisulphite | 33.00% |
| | 100.00% |

The gelling agent was hydrated at 3% in 97% water. This was done using a high shear mixer. The hydrated mix was left to stand for at least 12 hours after mixing.

Hutchinsons Golden cake flour (150 kg per hour) was mixed with water (35 kg per hour) to form a slurry. The slurry was fed into a Clextral twin-screw extruder. The hydrated gelling agent was injected into the flat zone of the extruder in an amount of 7.5% (13.88 kg per hour). The extruded mixture was chopped into pieces and allowed to expand to form a bubble. When dried to a moisture content of 2% w/w the bulk density was 150 g·l$^{-1}$. The bubble was dried and milled and the resulting crumb was short and crisp. Application to a food substrate made a hard crumb coating. The dried bag product had a shelf life exceeding 12 months.

After extrusion the extrudate may be milled and sieved to produce crumb particles of the desired size which passed through a 4 mm sieve but were retained by a 3 mm sieve. Crumb fines which passed through a 1 mm sieve resultant from milling of larger crumb particles were used in application to the substrate pieces coated with the aqueous coating.

Example 6

Production of Microwaveable Frozen Chicken Nuggets

Stabilised substrates prepared in accordance with Example 2 were coated with an aqueous coating composition as described in Example 3. A fine crumb coating as described in Example 5 was applied followed by a batter coating as described in Example 4.

Next a coating of the coarse crumb of Example 5 (particle size 3-4 mm) is applied using a CrumbMaster applicator (24) manufactured by CFS, Bakel, Netherlands.

Figure 4:
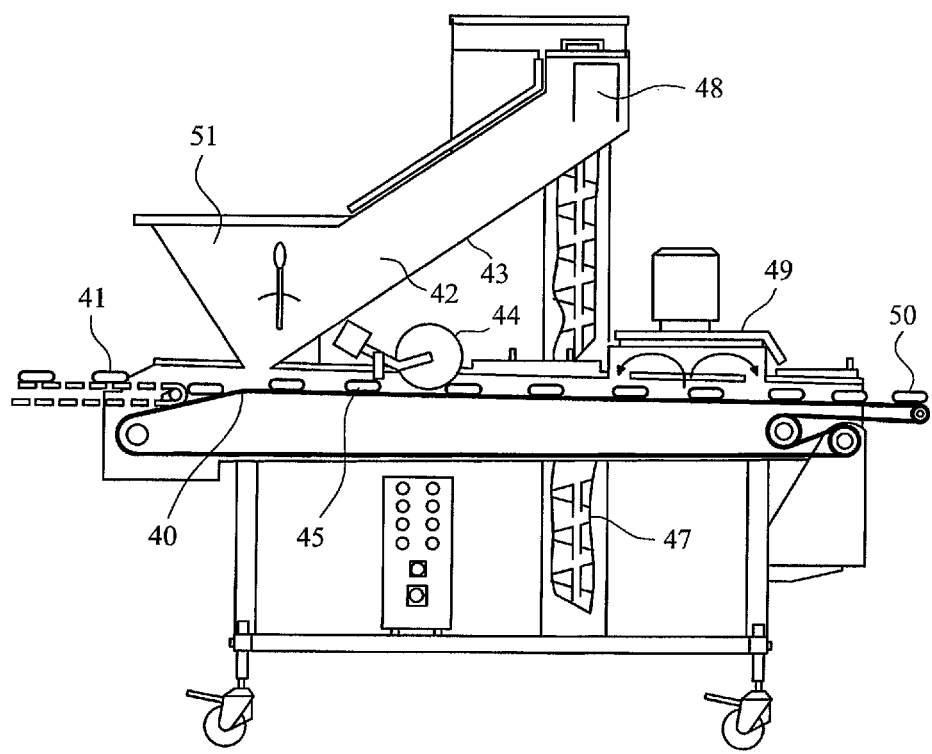
FIG. 4 is a cross sectional view of a crumb coating apparatus.

The crumb applicator is shown in cross sectional view in FIG. 4.

An endless conveyor (40) passing over a guide plate (46) receives battered substrate pieces (41). A supply of 2 mm crumb (42) contained in hopper (43) has an outlet extending across the width of the conveyor (40). Additional crumb may be added through inlets (51). Excess crumb (45) passing through the chain link conveyor (40) is collected by screw lift (47) and ejected into the top (48) of the hopper (43). A roller (44) serves to compress the crumb onto the surface of the substrate particles. An air blower (49) removes excess crumb from the coated particles, following which the particles (50) pass to a second crumb application station (Stage 8) for application of lighter grist crumb for infill between the larger crumb applied in Stage 7. The configuration of the batter crumb applicator (25) is similar to that of the first crumb applicator (24).

Following application of the first and second crumb layers the coated substrates enter a fryer (26). The construction of the fryer is shown in detail in FIG. 5.

Heated oil (60) contained in an elongate reservoir (61) is heated to a constant temperature of 180 to 188° C. Pure rapeseed oil is employed.

Parallel upper and lower conveyors (62, 63) prevent the substrate pieces from floating during passage through the fryer. A frying time of 2 minutes 20 seconds may be used although this may be varied dependent on the weight and size of the particles. After frying the core temperature of the particles was in the range 74-85° C. A small loss of weight was observed due to loss of water from the substrate but this is mostly compensated for by an uptake of oil.

Following frying, the fried products are transferred directly and without delay to a freezing station.

The fried products when removed from the heated oil had an external temperature of about 180° C. and a core temperature of about 90° C. The products were transferred by the conveyor into a cryogenic freezer during a period of not less than 2 minutes. During this time the temperature of the outer crumb was reduced due to contact with the atmosphere but the temperature of the core may rise for a brief period due to transfer of heat from the outer crumb layer to the core. On entry into the freezer the core temperature may be between 70° C. and 100° C., generally about 75° C.

The fried product of Stage 9 was immediately transferred in Stage 10 to a cryogenic freezer which reduced the core temperature to a maximum of −25° C., preferably −30° C. The time from the removal from the fryer to entry into the freezer was less than 2 minutes.

The transfer from the fryer to the freezer is arranged so that the core temperature of the product was reduced from 75° C. to −30° C. during a period not longer than 15 minutes.

The invention claimed is:

1. A method of producing a microwaveable, frozen, coated food product which substantially prevents steam generated during microwave reheating from drying out a core of edible material and making the coated food product soggy, by producing a core of edible material having a water content of at least 15 weight percent and not more than 90 weight percent and a crispy coated food product exterior after microwaving having a water content of not more than 10 weight percent; said method comprising the steps of:

providing an edible portion of a solid or solidified substrate as a core of edible material;

coating the core of edible material with aqueous precoating liquid which is a hydrated gel or viscous solution that comprises water and dry matter dissolved in the water to form a precoated portion;

applying a coating of bonding crumb to the precoated portion to form a crumb coated portion where the bonding crumb is bound to the substrate by the aqueous precoating liquid; wherein the bonding crumb contains dried and milled farinaceous dough extrudate containing from 0.05 to 5 weight percent of co-extruder guar gum;

applying a batter on top of the bonding crumb; wherein forming a batter coated portion;

applying a coating of coating crumb to the batter coated portion to form a breaded portion, wherein the coating crumb contains dried and milled farinaceous dough extrudate containing from 0.05 to 5 weight percent of co-extruded guar gum;

frying the breaded portion in a fryer by contacting said breaded portion for at least 100 seconds with hot oil having a temperature of at least 150° C., thereby producing a fried coated portion having a core temperature in excess of 70° C.;

directly transferring the fried coated portion from the fryer into a cryogenic freezer, and cryogenically freezing the fried coated portion;

wherein the core temperature of the fried coated portion is not less than 60° C. when said fried coated portion is introduced into the cryogenic freezer and wherein said core temperature is reduced to less than −15° C. in the cryogenic freezer; wherein using the guar gum containing milled dough extrudate in both the bonding crumb and coating crumb, together with the batter coated portion, causes the crumb coated portion and breaded portion to form a shell which acts as a barrier to penetration of oil into the core of edible material, producing a fully cooked fried product, and wherein steam produced during microwave reheating substantially escapes from the product without causing the crumb coated portion to become soggy, and wherein the method yields a frozen, microwavable, core of edible material and a crispy and crunchy breaded portion.

2. The method according to claim 1, wherein the fried coated portion has a core temperature of not less than 65° C. when it is introduced into the freezer.

3. The method according to claim 1, wherein the fried coated portion has a core temperature not less than 70° C. when it is subjected to cryogenic freezing.

4. The method according to claim 1, wherein the fried coated portion is contacted with a cryogen until the core temperature of the portion is less than −22° C.

5. The method according to claim 1, wherein the core temperature of the fried coated portion does not decrease by more than 25° C. before the fried portion enters the freezer.

6. The method according to claim 1, wherein the aqueous precoating liquid has a minimum viscosity of 300 cP, measured using a Brookfield viscometer with a number 3 spindle at 60 rpm at 10° C. and wherein the aqueous precoating is formed by dissolvingthe dry matter in water and allowing the solution to stand.

7. The method according to claim 1, wherein the bonding crumb contains at least 80 weight percent of a milled farinaceous dough extrudate containing 0.05 to 5 weight percent of added hydrocolloid.

8. The method according to claim 7, wherein the hydrocolloid is selected from the group consisting of guar gum, locust bean gum, gum Arabic, tragacanth, gum karaya, gum ghatti, xanthan gum, and mixtures thereof.

9. The method according to claim 1, wherein the batter comprises, calculated by weight of dry matter, 20 to 55 weight percent starch; 20 to 55 weight percent flour; 3 to 20 weight percent egg solids.

10. The method according to claim 1, wherein, the batter, when it is applied to the crumb coated portion, has a viscosity of 200 to 1000 cP measured using a Brookfield viscometer with a number 3 spindle at 60 rpm.

11. The method according to claim 1, wherein the total amount of aqueous precoating liquid, batter and crumb that is applied to the portion is such that, after frying, the fried portion has a weight that exceeds the weight of the uncoated portion of solid substrate by 25 to 100%.

12. A microwaveable, coated food product obtained by a method according to claim 1.

13. The method according to claim 1, wherein the core temperature of the fried coated portion is not less than 60° C. when said fried portion is introduced into the freezer and wherein said core temperature is reduced to less than −15° C. in less than 40 minutes.

14. The method according to claim 1, wherein the core temperature of the fried coated portion does not decrease by more than 20° C. before the fried portion is contacted with a cryogen in the freezer.

15. The method according to claim 1, wherein the fried coated portion is contacted with a cryogen until the core temperature of the portion is less than −20° C.

16. The method according to claim 1, wherein transfer of the fried coated portion from the fryer to the freezer is arranged such that the core temperature of the fried coated portion is reduced from a temperature of 75° C. or greater to a temperature of −30° C. or less during a period not longer than 15 minutes.

17. The method according to claim 1, wherein the batter, when it is applied to the crumb coated portion, has a viscosity of 500 to 600 cP measured using a Brookfield viscometer with a number 3 spindle at 60 rpm.

18. The method according to claim 1, wherein the total amount of aqueous precoating liquid, batter and crumb that is applied to the portion is such that, after frying, the fried portion has a weight that exceeds the weight of the uncoated portion of solid substrate by 30 to 60%.

19. The method according to claim 1, wherein the substrate potion has a weight in the range of about 15 to 200 g and a thickness of up to 50 mm.

* * * * *